United States Patent Office 3,824,148
Patented July 16, 1974

3,824,148
ADHESION PROCESS AND ARTICLE
OBTAINED THEREBY
George Lopatin, Orinda, Calif., assignor to Shell Oil
Company, Houston, Tex.
No Drawing. Filed May 11, 1972, Ser. No. 252,396
Int. Cl. B32b 27/32, 31/12
U.S. Cl. 161—188                                       5 Claims

ABSTRACT OF THE DISCLOSURE

An adhesively bonded article is obtained by depositing certain anionically substituted block copolymers on one substrate, depositing a cationically substituted block copolymer on a second substrate and contacting the two polymers in the presence of water whereby an adhesively bonded article is formed.

BACKGROUND OF THE INVENTION

A great variety of adhesion systems have been investigated and for the most part can be referred to as pressure-sensitive adhesives, hot melt adhesives, emulsion adhesives and other specialty products designed for special methods of application or end use. In most cases, however, the adhesive systems proposed for commercial use must of necessity be applied and used under essentially anhydrous conditions. This seriously limits the great majority of such compositions in that it eliminates the possibility of adhesively bonding services which must be joined in the presence of or beneath water. Moreover, many systems require excessive amounts of heat in order to activate the adhesive and make it tacky. This, in turn, restricts the field of application for such adhesives since heating in many instances will damage the substrates to which they are joined.

The derivatization of polymeric materials with ionic groups provides the possibility of forming ionically active polymer derivatives which may be either anionic or cationic as desired. It would be expected that such materials when contacted with water would have some response thereto but it has been found that this response normally results in a sharp reduction in tensile strength and adhesive properties of the ionic derivatized polymers so treated.

Attempts have been made in the past to overcome this latter shortcoming. Among these, has been the derivatization of block copolymers such as referred to in U.S. Pat. 3,576,912. This latter patent refers to the formation of (among other derivatives) quaternary ammonium derivatives of a block copolymer exemplified by polystyrene-polyisoprene-polystyrene in which the quaternarization occurs in the diene polymer block. Under these circumstances it was found that the block copolymers maintained a relatively high tensile strength and extensibility even in the presence of water since the tensile strength apparently is directly related to unsubstituted end blocks and is not materially affected by the water saturated diene polymer blocks. Similar findings were made with the same type of block copolymer in which the diene blocks were substituted with sulfonate radicals.

OBJECTS OF THE INVENTION

It is an object of the present invention to provide an improved adhesion process. It is a special object of the invention to provide an ionic adhesion process which is effective and promoted by the presence of water. It is a further object of the invention to provide bonded articles obtained by such a process. Other objects will become apparent during the following detailed description of the invention.

STATEMENT OF THE INVENTION

Now, in accordance with the present invention, an adhesion process is provided which comprises the following steps: (a) depositing adherently on a substrate a block copolymer having at least one thermoplastic polymer block of the group consisting of monoalkenyl arene polymer blocks and hydrogenation products thereof, and at least one anionically derivatized polymer block of the group consisting of anionically-substituted conjugated diene polymer blocks and hydrogenation products thereof; (b) depositing adherently on a second substrate a block copolymer having at least one thermoplastic polymer block of the group consisting of monoalkenyl arene polymer blocks and hydrogenation products thereof, and at least one cationically-derivatized polymer block of the group consisting of cationically-derivatized conjugated diene polymer blocks and hydrogenation products thereof; (c) contacting each deposited polymer with water, and (d) thereafter contacting the two deposited wet polymers, whereby an adhesively bonded article results comprising the two substrates joined by the adhesively bonded polymers.

In further accordance with the invention novel bonded articles are provided comprising the articles obtained by the above-described process.

DESCRIPTION OF THE PREFERRED EMBODIMENT

The present invention relies upon the observations that the two types of derivatized block copolymers can be adherently deposited on substrates, absorb large amounts of water and retain a substantial amount of their tensile strength and extensibility, and when treated as described, result in a firm adhesion even in the presence of water. The present process permits rapid adhesion under low pressure by adhering artifacts under, or in the presence of, water by ionic bonding to another artifact coated with a second ionic polymer bearing the opposite charge. Furthermore, the bond so established is maintained even if water is removed. If the dry polymers are contacted together no adhesive bond whatsoever results. The utility of such a process and article then becomes surprisingly diverse and fills a long-existing need for an adhesive system which will be spontaneously effective in the presence of water.

The block copolymers from which the two types of ionic polymers are derived may have diverse macromolecular structures which do not constitute an essential part of the present invention as long as each block polymer molecule contains at least two monoalkenyl arene polymer blocks or their hydrogenation products and at least one conjugated diene polymer block separating them or hydrogenation products of such diene blocks. The block copolymers therefore may be either linear having a minimum structure of A—B—A or may have any greater number of alternating blocks arranged, e.g., in either a linear, radial or comb structure. Typical precursor block copolymers having the minimum required configuration are the following:

polystyrene-hydrogenated polyisoprene-polystyrene
polystyrene-polybutadiene-polystyrene
polystyrene-polyisoprene-polystyrene
polyvinylcyclohexane-hydrogenated polybutadiene-polyvinylcyclohexane.

The methods for the formation of these various classes of block copolymers are known in the art and are disclosed in a large number of U.S. patents including the following: U.S. 3,265,765, U.S. 3,595,942, reissued 27,145 and U.S. 3,333,024. The hydrogenation of the block copolymers is described in the latter patent and in U.S. 3,595,942.

The block molecular weights may be chosen for specific end uses. Normally, however, the monoalkenyl arene polymer blocks and their hydrogenated counterparts will have number average molecular weights between about 10 and $50 \times 10^3$, preferably between about 12.5 and $25 \times 10^3$. The conjugated diene polymer blocks normally range between about 50 and $250 \times 10^3$, preferably between about 60 and $150 \times 10^3$ and number average molecular weight. These molecular weights are determined by tritium counting methods or osmotic pressure methods. Conjugated dienes suitable for forming the polymer blocks to be later derivatized include especially butadiene and isoprene. Monoalkenyl arenes to be used in the formation of the unsubstituted polymer blocks include especially styrene, alpha methyl styrene and tertiary butyl styrene. The proportion of the two types of blocks may be varied over a range from about 10 to 55 weight percent of the unsubstituted monovinyl arene hydrogenated derivatives thereof.

The derivatization of the block copolymers may be carried out by methods already known in the art. For example, U.S. 3,576,912 describes a process for forming quaternarized block polymers wherein the quaternary substituents are placed in the diene polymer block. While ammonium radicals are preferred, other onium radicals may be utilized including phosphonium, arsonium or stibonium radicals. These may bear hydrocarbyl substituents which may be either alkyl or aryl hydrocarbyl groups and the radicals also may include ionically active halogen atom such as chlorine, bromine or iodine. Suitable and typical radicals include trimethyl ammonium bromide, triphenyl ammonium bromide or dimethyl pyridinium bromide. The cationically substituted polymers may have a degree of substitution which may vary over a substantial range but which should be sufficient to promote water swellability of the diene block which they are derivatizing and also sufficient to promote the formation of an effective ionic bond between the cationic polymer and the anionic counterpart thereof. Preferably this extent of derivatization will be between about 0.3 and 5 meq./g., preferably between about 0.6 and 3 meq./g.

The selective anionic derivatization of the block copolymers may be carried out, for example, by selective carboxylation or sulfonation thereof using a process, for example, which may involve complexes of chlorosulfonic acid with ethers to promote such selectivity.

The degree of derivatization of the anionic polymers may be within the ranges described above for the cationic polymers. Briefly, the sulfonate radicals or other anionic radicals are ionically associated with an alkali metal radical such as sodium, potassium or lithium.

The substrates on which the two types of ionically derivatized block polymers are positioned are unrestricted in identity but may include, for example, such diverse structures as glass, metal, wood, textiles, as well as paper and paper products, polymers and elastomers such as polyethylene, polypropylene, block copolymers, cured rubbers such as polyisoprene or polybutadiene and elastomers such as polystyrene and the like. Conveniently, the anionic derivatized polymers are deposited in the form of a cement of a sulfonyl chloride derivative of the block polymer and thereafter hydrolyzed in situ with an alkali metal hydroxide. The cationic derivatized polymers may be deposited on a substrate as a cement in their final form as an onium substituted block copolymer, and any organic solvent which is present is then evaporated. Before adhesion the two polymers, adherently attached to their substrates, are contacted with water for a time sufficient to cause an appreciable amount of swelling.

The term "water" is intended to include any aqueous medium that will promote swelling of the derivatized polymers and their subsequent adhesion to each other. Normally, this will include fresh water from natural sources, brackish water and salt water, the latter having, for example, from 0.1 to 3.5% sodium chloride content. If the salt content is any higher, little, if any, adhesion occurs. The temperature of water contacting does not appear to be critical but normally would be ambient temperatures between about 10° C. and 35° C. for times ranging from about one minute to 48 hours, usually between 15 minutes and 24 hours. The proportion of water to adhesive does not appear to be critical but it is preferred that an excessive amount be employed, i.e., that the exposed face of each of the derivatized block polymers be immersed in water and preferably at least all of the derivatized block polymer (adhesively attached to its substrate) be submerged under water.

The following working examples illustrate the process of the present invention and the articles so obtained.

A first selectively hydrogenated block copolymer having the structure polystyrene-hydrogenated polyisoprene-polystyrene was prepared by the method disclosed in U.S. Pat. 3,595,942 and had block molecular weights of 5,000–70,000–15,000. It was sulfonated in the center block by treatment with a mixture of $SO_2$ and $Cl_2$ in the presence of actinic radiation and hydrolyzed to give a polymer having 2.0 meq./g. sulfonate content. A second block copolymer having the structure of polystyrene-polybutadiene-polystyrene (block molecular weights of 9,500–52,000–9,500) was treated as in U.S. Pat. 3,576,912 to form a trimethyl ammonium derivative having 0.7 meq./g. ammonium ions.

Glass cloth samples 5 x ¼" were utilized in the following tests. One strip was soaked in a 10% solution of the first polymer in tetrahydrofuran and dried. A second strip was soaked in a 10% solution of the second polymer in toluene and dried. The first polymer was hydrolysed overnight at ambient temperature in a solution comprising 250 cc.'s water, and 250 cc.'s methanol, 250 cc.'s tetrahydrofuran and 20 grams sodium hydroxide, thus converting the sulfonate chloride groups to sodium sulfonate radicals. After rinsing, the two coated strips were soaked for 10 minutes in O.1N aqueous sodium chloride solution and thereafter placed together. Similar pairs of textile strips impregnated with the two above-described anionic and cationic polymers were prepared using Dacron, Orlon and Nylon textiles. In each of the above cases, following hand-pressing of the pairs of coated textiles together, the samples were dried (air drying—ambient temperature—16 hours). It was found in each case that a firm adhesive bond was so formed having bond strength in the order of 40–140 p.s.i. in a lab test.

The above experiments were repeated with the same pair of anionic and cationic block copolymers coated on wood. Again, excellent adhesion occurred after the samples were placed and dried as described above.

I claim as my invention:
1. An adhesion process which comprises:
   (a) depositing adherently on a substrate a block copolymer having at least one thermoplastic polymer block of the group consisting of monoalkenyl arene polymer blocks and hydrogenation products thereof, and at least one anionically derivatized polymer block of the group consisting of anionically substituted conjugated diene polymer blocks and hydrogenation products thereof;
   (b) depositing adherently on a second substrate a block copolymer having at least one thermoplastic polymer block of the group consisting of monoalkenyl arene polymer blocks and hydrogenation products thereof, and at least one cationically derivatized polymer block of the group consisting of cationically derivatized conjugated diene polymer blocks and hydrogenation products thereof;
   (c) contacting each deposited polymer with water; and
   (d) thereafter contacting the two deposited wet polymers whereby an adhesively bonded article results comprising the two substrates joined by the adhesively bonded polymers.

2. A process according to claim 1 wherein the anionically derivatized polymer block is a sulfonated polymer block of a conjugated diene.

3. A process according to claim 1 wherein the cationically derivatized block is a quaternary ammonium derivatized block.

4. An adhesively bonded article comprising two substrates bonded together by a bonded union of a first block copolymer deposited on a first substrate, said copolymer having at least two thermoplastic polymer blocks of the group consisting of monoalkenyl arene polymer blocks and hydrogenation products thereof, and at least one anionically derivatized polymer block of the group consisting of anionically substituted conjugated diene polymer blocks and hydrogenation products thereof; a second block copolymer deposited on a second substrate, said copolymer having at least two thermoplastic polymer blocks of the group consisting of monoalkenyl arene polymer blocks and hydrogenation products thereof, and at least one cationically derivatized polymer block of the group consisting of cationically derivatized conjugated diene polymer blocks and hydrogenation products thereof, said article having been prepared by contacting the two deposited block copolymers in the presence of water.

5. An article according to claim 4 wherein the anionic polymer block is a sulfonated polymer block of a conjugated diene and the cationic block is a quaternary ammonium derivatized polymer block of a conjugated diene.

References Cited
UNITED STATES PATENTS

| | | | |
|---|---|---|---|
| 3,239,478 | 3/1966 | Harlan | 161—255 X |
| 3,242,038 | 3/1966 | Dallas et al. | 161—255 X |
| 3,439,064 | 4/1969 | Makowski et al. | 161—255 X |
| 3,634,186 | 1/1972 | Bostick et al. | 161—188 X |
| 3,738,907 | 6/1973 | Bronstert et al. | 161—255 X |
| 3,740,290 | 6/1973 | Kelsey et al | 161—188 X |
| 3,758,362 | 9/1973 | Brown | 161—188 X |
| 3,764,458 | 10/1973 | Fiegel | 161—255 X |

HAROLD ANSHER, Primary Examiner

U.S. Cl. X.R.

156—310; 161—255; 260—880 B